United States Patent
Lo et al.

(10) Patent No.: US 11,126,166 B2
(45) Date of Patent: Sep. 21, 2021

(54) INTELLIGENT WORKPIECES

(71) Applicant: Siemens Aktiengesellschaft, Munich (DE)

(72) Inventors: George Lo, Langhorne, PA (US); Dong Wei, Edison, NJ (US); Kun Ji, Plainsboro, NJ (US); Kurt Dirk Bettenhausen, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/766,498

(22) PCT Filed: Nov. 6, 2015

(86) PCT No.: PCT/US2015/059442
§ 371 (c)(1),
(2) Date: Apr. 6, 2018

(87) PCT Pub. No.: WO2017/078730
PCT Pub. Date: May 11, 2017

(65) Prior Publication Data
US 2018/0299870 A1    Oct. 18, 2018

(51) Int. Cl.
*G05B 19/418* (2006.01)

(52) U.S. Cl.
CPC ........... *G05B 19/4183* (2013.01); *G05B 19/41805* (2013.01); *G05B 19/41895* (2013.01);
(Continued)

(58) Field of Classification Search
CPC ......... G05B 19/4183; G05B 19/41805; G05B 19/41895; G05B 2219/31086; G05B 2219/31095; G05B 2219/31304; G05B 2219/32036; Y02P 90/04; Y02P 90/10; Y02P 90/18; Y02P 90/20; Y02P 90/02
(Continued)

(56) References Cited

U.S. PATENT DOCUMENTS 4,827,423 A    5/1989   Beasley et al.
6,400,999 B1 *  6/2002   Kashiyama ...... G05B 19/41865
                                                      700/100
(Continued)

FOREIGN PATENT DOCUMENTS

CN    88100316 A     8/1988
CN     1860470 A    11/2006
(Continued)

OTHER PUBLICATIONS

Armando W. Colombo, An Agent-Based Intelligent Control Platform for Industrial Holonic Manufacturing Systems, Feb. 1, 2006. IEEE Transactions on Industrial Electronics, vol. 53, (Year: 2006).*
(Continued)

*Primary Examiner* — Kenneth M Lo
*Assistant Examiner* — Mohammed Shafayet (57) ABSTRACT

An intelligent workpiece system includes a workpiece comprising a portion of a product; and an embedded computing system attached to the workpiece. The embedded computing system is configured to communicate with machines in a manufacturing environment to facilitate assembly of the workpiece into the product at a plurality of assembling areas.

19 Claims, 6 Drawing Sheets

(52) U.S. Cl.
CPC ........... *G05B 2219/31086* (2013.01); *G05B 2219/31095* (2013.01); *G05B 2219/31304* (2013.01); *G05B 2219/32036* (2013.01); *Y02P 90/02* (2015.11)

(58) Field of Classification Search
USPC .......................................................... 700/102
See application file for complete search history.

(56) References Cited

U.S. PATENT DOCUMENTS

| | | | |
|---|---|---|---|
| 9,037,282 B2 | 5/2015 | Reid et al. | |
| 2002/0026392 A1* | 2/2002 | Shimizu | G06Q 30/0283 705/29 |
| 2002/0077723 A1* | 6/2002 | Schoop | B23Q 41/02 700/225 |
| 2004/0007311 A1* | 1/2004 | Saito | B23P 19/04 156/137 |
| 2004/0055131 A1* | 3/2004 | Ghuman | B23K 37/0426 29/429 |
| 2004/0084520 A1* | 5/2004 | Muehl | G05B 19/4183 235/376 |
| 2007/0299800 A1 | 12/2007 | Bayoumi et al. | |
| 2008/0057830 A1* | 3/2008 | Molnar | G06Q 10/06 451/5 |
| 2001/8103622 | 5/2008 | Drago | |
| 2011/0314665 A1* | 12/2011 | Kilibarda | B23P 19/001 29/783 |
| 2012/0068496 A1* | 3/2012 | Ellis | B60N 2/012 296/181.1 |
| 2012/0330448 A1* | 12/2012 | Reid | G05B 19/41805 700/96 |
| 2013/0174111 A1* | 7/2013 | Durkan | G06F 30/398 716/112 |
| 2013/0204752 A1* | 8/2013 | Damon | B29D 30/0005 705/28 |
| 2014/0022093 A1* | 1/2014 | Hubauer | G05B 19/4183 340/870.02 |
| 2014/0121828 A1* | 5/2014 | Fuhlbrigge | G05B 19/41895 700/228 |
| 2014/0129503 A1* | 5/2014 | Yang | G06N 5/04 706/46 |
| 2014/0249884 A1* | 9/2014 | Hong | G06Q 10/087 705/7.25 |
| 2014/0259615 A1* | 9/2014 | Fukuda | B23Q 41/06 29/430 |
| 2015/0025669 A1 | 1/2015 | Liu | |
| 2017/0308067 A1* | 10/2017 | Lamparter | G05B 19/4183 |
| 2018/0276608 A1* | 9/2018 | Stadie | B65G 1/0464 |

FOREIGN PATENT DOCUMENTS

| | | |
|---|---|---|
| CN | 102841541 A | 12/2012 |
| CN | 104155931 A | 11/2014 |
| CN | 104809523 A | 7/2015 |
| EP | 2940539 A2 | 11/2015 |
| WO | 2005113206 A1 | 12/2005 |

OTHER PUBLICATIONS

RU Search Report dated Feb. 4, 2019; Application No. 2018120721; Filing Date: Nov. 6, 2015; 9 pages.
RU Search Report Translation dated Feb. 4, 2019; Application No. 2018120721; Filing Date: Nov. 6, 2015; 2 pages.
International Search Report dated Jun. 24, 2016; Application No. PCT/US2015/059442; Filing Date: Nov. 6, 2015; 12 pages.
Chinese Office Action dated Mar. 25, 2020; Application No. 201580084323.6; 23 pages.
Colombo, Armando Walter et al.; "An Agent-Based Intelligent Control Platform for Industrial Holonic Manufacturing Systems"; IEEE Transactions on Industrial Electronics; vol. 53; No. 1; pp. 322-336.
Search Report for related Chinese patent application 201580084323. 6, dated Mar. 19, 2020, pp. 1-3.
Notification of Grant of Patent dated Jun. 29, 2021; Application No. 201580084323.6; 6 pages.

* cited by examiner

|  | Estimated | | Actual | |
|---|---|---|---|---|
| Crank set and Pedal assembling | Time<br>Cost<br>Energy<br>Carbon footprint | 01/22/2015<br>$4.5<br>0.75 kwh<br>60 lbs | Time<br>Cost<br>Energy<br>Carbon footprint | 01/20/2015<br>$4.2<br>0.60 kwh<br>55 lbs |
| Chain ring Assembling | Time<br>Cost<br>Energy<br>Carbon footprint | 01/22/2015<br>$3.2<br>0.40 kwh<br>35 lbs | Time<br>Cost<br>Energy<br>Carbon footprint | 01/20/2015<br>$3.2<br>0.40 kwh<br>35 lbs |
| Front set Assembling | Time<br>Cost<br>Energy<br>Carbon footprint | 01/22/2015<br>$1.2<br>0.15 kwh<br>15 lbs | Time<br>Cost<br>Energy<br>Carbon footprint | |
| Wheel Assembling | Time<br>Cost<br>Energy<br>Carbon footprint | 01/22/2015<br>$2.5<br>0.20 kwh<br>20 lbs | Time<br>Cost<br>Energy<br>Carbon footprint | |
| Seat post and Saddle assembling | Time<br>Cost<br>Energy<br>Carbon footprint | 01/22/2015<br>$1.25<br>0.2 kwh<br>25 lbs | Time<br>Cost<br>Energy<br>Carbon footprint | |
| Testing | Time | 01/22/2015 | Time | |
| Shipping | Time<br>Cost<br>Energy<br>Carbon footprint | 01/22/2015<br>$12.75<br>1.70 kwh<br>155 lbs | Time<br>Cost<br>Energy<br>Carbon footprint | |

INTELLIGENT WORKPIECES

This application is a national phase filing under 35 U.S.C. § 371 of International Patent Application No. PCT/US2015/059442, filed Nov. 6, 2015, which is incorporated herein by reference in its entirety.

TECHNICAL FIELD

The present disclosure relates to systems, methods, and apparatuses related to an intelligent workpiece which comprises a workpiece and an embedded computing system. The intelligent workpiece may be applied in various manufacturing scenarios and other industrial automation environments.

BACKGROUND

In conventional production lines, control intelligence is centralized by a Manufacturing Execution System (MES) or Programmable Logic Controller (PLC) to optimize production and minimize energy and other costs of a batch of products. This method is suitable for mass production of standard products with the same requirements of delivery time, quality and cost; however centralized intelligence is ill-suited to more diverse production environments where individual products may vary, for example, in terms of delivery time, materials, quality, or cost.

Recently, some convention production lines have added an additional layer of intelligence at the workpiece level using Radio-Frequency Identification (RFID) tags. Each workpiece represents a component of the finished product. As the workpiece moves through the production line, the RFID attached to the workpiece can be used to record production information and to provide inputs to production automation systems. While this technique helps to decentralized intelligence across the production line, the workpiece's intelligence is extremely limited because the workpiece is unable to make decisions regarding how it interacts with other components of the automation system; rather these decisions must be made by the MES or the PLC. Thus, individualized optimization of the workpiece (e.g., in terms of cost and delivery time, etc.) may not be achieved since the production automation systems always focus on optimization across the entire production line.

Accordingly, it is desired to provide techniques for enhancing workpieces with intelligence that allows them intelligently interact with the production environment, thereby facilitating optimization on the workpiece-level.

SUMMARY

Embodiments of the present invention address and overcome one or more of the above shortcomings and drawbacks, by providing methods, systems, and apparatuses related to a manufacturing system which provides intelligence at the workpiece-level to enable individualized optimization, e g minimizing its manufacturing cost while still meeting its other requirements of delivery time, manufacturing quality and design specification. The current major products on market of mass standardization production enable users/customers to experience the product itself only; some products may enable users/customers to experience the unique design of the product. In some embodiments, the techniques described herein propose a method to enable users/customers to experience production as well, i.e. customized production.

According to some embodiments, an intelligent workpiece system includes a workpiece comprising a portion of a product; and an embedded computing system attached to the workpiece. The embedded computing system is configured to communicate with machines in a manufacturing environment to facilitate assembly of the workpiece into the product at assembling areas. The embedded computing system may be configured to select a particular machine at each respective assembling area for performing assembly operations. For example, in some embodiments, the embedded computing system selects each machine based on machine status information received from controllers corresponding to available machines in the respective assembling area. The embedded computing system may transmit product requirements to the controllers which control machine(s) at each respective assembling area. For example, in one embodiment, the embedded computing system is configured to broadcast the product requirements to the one or more controllers. In some embodiments, the embedded computing system is further configured to communicate with one or more automated guided vehicles to facilitate transportation between the assembling areas.

The aforementioned system (with or without the additional features discussed above) may be refined or supplemented with supplementary features in different embodiments. For example, in some embodiments, the embedded computing system comprises a power supply which is configured to be recharged at one or more recharging stations within the manufacturing environment. In other embodiments, the embedded computing system is further configured to store records comprising information related to a subset of the machines that performed assembly operations on the workpiece. The information for each respective machine in the subset of the machines may include, for example, an indication of one or more of used materials or parts, energy consumed, or carbon footprint of the respective machine resulting from a respective assembly operation performed on the workpiece. Additionally, the information may further include one or more of a batch number, a supplier identifier, and an indication of data produced by the respective machine.

According to other embodiments, a method for manufacturing a product comprising a workpiece includes receiving, by an embedded computing system operably coupled to the workpiece, product requirement information from a gateway server. The product requirement information may be specified, for example, in terms of at least one of design features, delivery time, and desired cost. The embedded computing system identifies assembling areas for assembling the product using the workpiece and performs an assembly process for each of the areas. The assembly process performed at each respective assembling area includes broadcasting or multicasting at least a portion of the product requirement information corresponding to the respective assembling area, receiving service availability information corresponding to machines operating in the respective assembling area, selecting a particular machine included in the machines based on the service availability information, communicating with one or more automated guided vehicles to facilitate transportation of the embedded computing system and the workpiece to the particular machine, and providing input information related to the workpiece to the particular machine.

The aforementioned method may be refined or supplemented with additional features in different embodiments. For example, in one embodiment, following the assembly process performed at each respective assembling area, an assembly progress record accessible to an end user of the product is updated with information corresponding to the assembly process. In another embodiment, the embedded computing device receives electricity pricing information and uses that information to select machine(s) in each assembling area.

The embedded computing system used in the aforementioned method may also have storage capabilities. For example, in some embodiments, the embedded computing system stores an indication of which machines in each assembling area worked on the workpiece. In another embodiment, the embedded computing system determines and stores an indication of energy consumption (and/or an indication of carbon footprint) resulting from work performed in the assembling area on the workpiece.

The aforementioned method may also have additional features related to the interaction between the embedded computing system and operators or end users. For example, in one embodiment, the embedded computing system receives a request from a requesting device for information related to the workpiece stored on the embedded computing system. In response, the embedded computing system transmits an indication of which machines in each assembling area worked on the workpiece to the requesting device in response to the request. In another embodiment, the embedded computing system identifies an alarm condition related to at least one of the embedded computing system and the workpiece and transmits a message indicating the alarm condition to an operator or end user. This alarm condition may include, for example, one or more of a low battery of the embedded computing system, a change in scheduled delivery time, and an upcoming scheduled delivery time. The message may also include a suggestion to the operator or end user on how the assembly process may be modified to address the alarm condition.

According to other embodiments, a manufacturing system includes a plurality of controllers and an embedded computing system. The controllers are connected to machines configured to perform an assembly process involving a workpiece to result in a product. Each respective controller is configured to broadcast (or multicast) availability information corresponding to one or more of the machines. The embedded computing system is attached to the workpiece and configured to receive the availability information, select a subset of the machines to complete the assembly process, and communicate with one or more automated guided vehicles to facilitate transportation of the workpiece between each respective machine.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to an industrial manufacturing system which provides intelligence at the workpiece level via an embedded computing system attached to the workpiece. This approach helps the workpiece exchange information with the production automation system and makes decisions during production, hence enabling optimization of the production of each single customized product with objectives such as production cost, energy consumption, carbon footprint and delivery time. A good analogy of this concept is the traffic jam handling scenario in the intelligent transportation system (ITS)—assume that there is traffic jam on Route X, the ITS may redirect traffic flow to Route Y. However, driver D, as the intelligent driver, may think that if all traffic is redirected to Route Y, there would be traffic jam on Route Y soon, and it may take less time to continue driving on Route X rather than Route Y. Driver D participated in the decision making of which route he should take based on the individualized optimization with the objective of shortest driving time for Driver D. Accordingly, the techniques described herein may be utilized to optimize the operation of the various machines and materials used in the manufacturing process. Additionally, as explained in greater detail below, the described techniques also may be used to facilitate customized manufacturing processes which are configured based on input from end-users of the product which is being manufactured.

Figure 1:
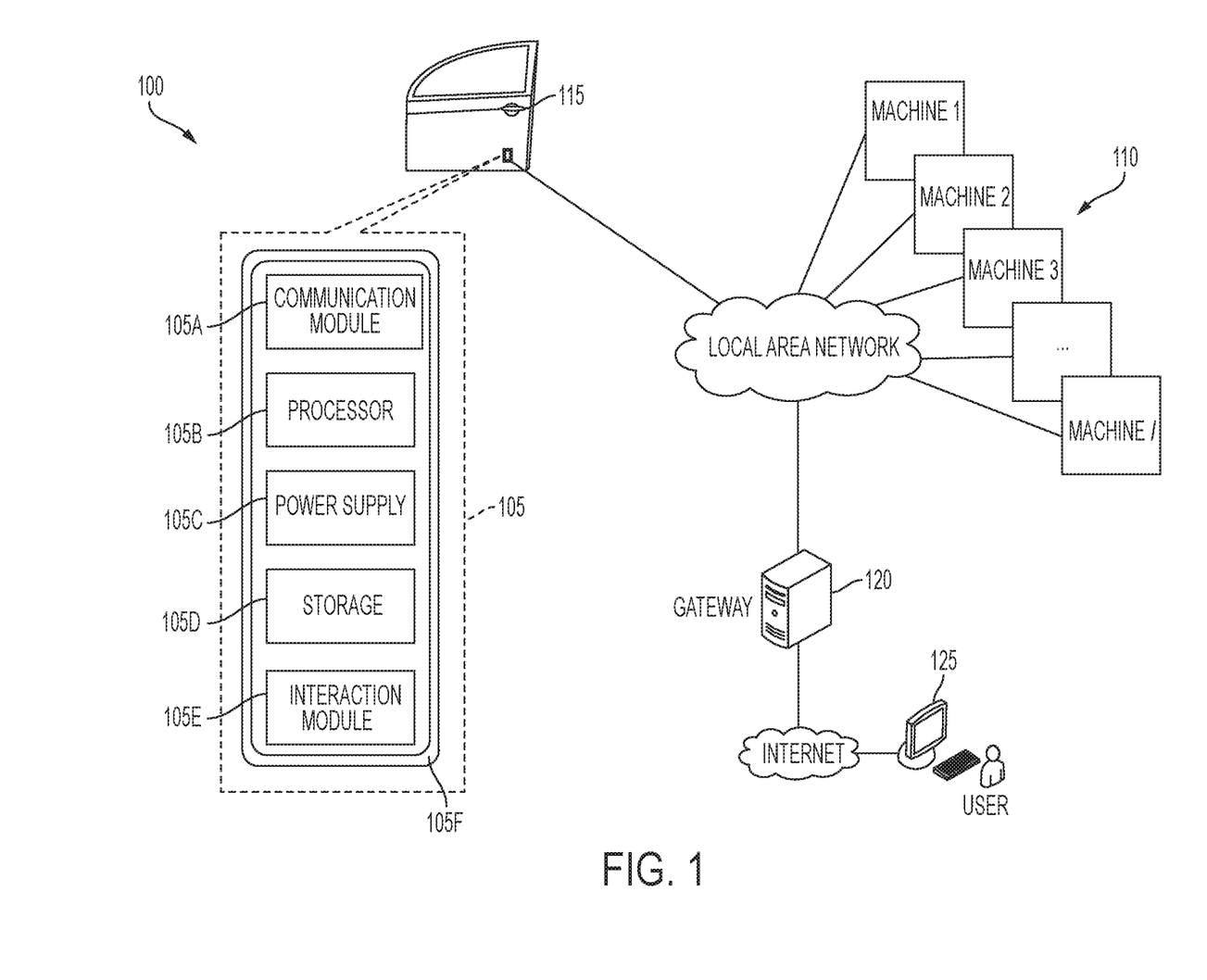
FIG. 1 provides a conceptual view of a system that utilizes an embedded computing system to provide intelligence to a workpiece, according to some embodiments.

FIG. 1 provides a conceptual view of a system 100 that utilizes an Embedded Computing System 105 to provide intelligence to a Workpiece 115, according to some embodiments. In the example of FIG. 1, the Workpiece 115 is an automobile door. However, it should be understood that the general concepts illustrated in FIG. 1 and discussed generally below may be extended to any type of workpiece processed in an industrial environment. In general, the Embedded Computing System 105 may be any mini-computer system generally known in the art including, for example, systems such as Raspberry Pi™, Arduino™, BeagleBoard™, or PandaBoard™.

Briefly, the Workpiece 115 is incorporated into an automobile by an industrial process performed by Machines 110 on a production line. One or multiple industrial grade wireless routers on plant floor (not shown in FIG. 1) may be used to exchange data between the various devices in the system 100. A production process is started based on instructions provided by a Gateway Server 120 to the Embedded Computing System 105. In some embodiments, these instructions may be automatically generated based on a desired batch processing for a production system. For example, a factory may desire to construct 100 automobiles of a particular type. In other embodiments, the End User 125 may submit order requests to the Gateway Server 120 via the Internet. In this way the Gateway Server may customize the production process for the End User 125. The Machines 110 communicate information related to each machine's operation in a broadcast or multicast manner. This information is received by an Embedded Computing System 105 attached to the Workpiece 115. Based on the received information, the Embedded Computing System 105 communicates with various devices in the industrial environment to use the Machines 110 to complete the assembly process. The Embedded Computing System 105 may provide production process updates to the End User 125 either directly or indirectly through the Gateway Server 120. In this way, the End User 125 can use a mobile phone or any web browser to understand where his/her product is in the production process, the expected delivery time, etc.

Examples of information that may be broadcasted by each of the Machines 110 includes, without limitation, machine status (e.g., working, idle, off, or maintenance service); buffer size and the number of backlogged workpieces in the buffer; expected processing time for all workpieces in the buffer; expected quality of production; expected processing time of the incoming workpiece; available materials and parts and related data (e.g., quality, size, color, type); expected energy consumption and carbon footprint; expected processing cost; and/or expected maintenance time (if the machine status is in maintenance). Additionally, information such as the real-time price of electricity and scheduled production process for the incoming workpiece by the production line automation system may be broadcasted to enhance individualized workpiece optimization.

The Embedded Computing System 105 includes a Case 105F which is used to affix it to the Workpiece 115. Various techniques may be used for affixing the Embedded Computing System 105 to the Workpiece 115, and the method of affixing may depend on the composition of the Workpiece 115 itself. For example, if the Workpiece 115 is a ferromagnetic material, the casing of the Embedded Computing System 105 may be magnetic. Alternatively, non-magnetic techniques for affixing may be used such as, for example, adhesive-based or Velcro-based systems. Additionally, the Case 105F of the Embedded Computing System 105 may be shaped to aid its attachment to the Workpiece 115. For example, for a curved workpiece like a bicycle frame, the Case 105F may likewise be curved. Moreover, the Case 105F may be designed to sustain certain environmental conditions present in the industrial environment. Thus, for example, it may be water-proof and shock-proof.

The Embedded Computing System 105 includes a Communication Module 105A which is configured to send and receive data from sources outside of the Embedded Computing System 105. For example, on the loading station at the beginning of the production, the Communication Module 105A may receive all information related to the Workpiece 115 via a wireless link from a machine at the end of the production or, alternatively, via a Gateway Server 120. Later in the industrial process (e.g., at the unloading station), the Communication Module 105A may upload all information related to the Workpiece 115 to the Gateway Server 120 (or some other system local or external to the system 100) via the wireless link as well. The Communication Module 105A may implement various communication protocols to facilitate communications with external devices. For example, in some embodiments, the Embedded Computing System 105 and the Machines 110 each communicate via Wi-Fi using an IPv4 broadcast address, while the Embedded Computing System 105 communicates directly with the Gateway Server 120 using a unicast address. In other embodiments, the IPv6 protocol is used for Wi-Fi communications. Since IPv6 does not include broadcast functionality, the multicast features of the protocol may be employed. For example, one or more multicast addresses can be assigned to the Machines 110. The Embedded Computing System 105 can then simulate broadcast functionality by sending a message to these multicast addresses. It should be noted that the communications are limited to Wi-Fi and may be extended to other communication techniques and protocols as well.

Processor 105B executes an intelligent program which enables the Embedded Computing System 105 to broadcast (or multicast) service requirements to the Machines 110 on the plant floor and receive information (e.g., manufacturing cost, buffer size, backlog, manufacturing quality, available materials and parts, etc.) from those Machines 110. Additionally, the Processor 105B handles interaction and negotiation between the Machines 110 and the Embedded Computing System 105, allowing the Embedded Computing System 105 to make decisions regarding which of the Machines 110 will be used to run the next production process/step on the Workpiece 115. For example, based on information received from the Machines 110, a preferred machine can be selected and the Embedded Computing System 105 can send an appropriate request to an automated guided vehicle (AGV) to effectuate transportation. The request may be generated, for example, using machine location information stored within the Embedded Computing System 105 or the AGV. Alternatively, the Embedded Computing System 105 may communicate with the Gateway Server 120 or the machine itself to determine the machine location information which then can be used to generate the request for the AGV.

Power Supply 105C provides power to the Embedded Computing System 105. In some embodiments, the Power Supply 105C is a conventional battery with its capacity sized according to the power demand of the Embedded Computing System 105. This battery may be situated in the Embedded Computing System 105 such that it is easily replaceable. In some embodiments, the Power Supply 105C may comprise a rechargeable resource such that it is charged at wireless charging stations on plant floor, such as buffer space and parking space (not shown in FIG. 1). Wireless charging stations can be distributed at some buffers on plant floor to charge the batteries used by the Embedded Computing System 105. For embodiments, where the Embedded Computing System 105 is installed on a pallet or container (described below), the wireless charging stations can be installed in a different storage location (e.g., in the parking lot).

Storage 105D is a computer readable medium which stores information related to product requirements in terms of, for example, design (e.g., size, color, material, etc.), delivery time, quality, manufacturing processes/steps, and cost of each process. Additionally, Storage 105D may store information of when and which machines worked on the Workpiece 115, materials, energy consumption on each process, carbon footprint, etc.

Interaction Module 105E is configured to generate Human-Machine-Interfaces (HMIs) and other graphical user interfaces with operators and users to facilitate interaction with the Embedded Computing System 105. For example, Interaction Module 105E may enable operator's mobile HMIs (not shown in FIG. 1) to read information from the Embedded Computing System 105 such as firmware version, battery life and processing state of the Workpiece 115.

In some embodiments, the Interaction Module 105E is configured to send alarms related to, for example, battery state and the processing state of the Workpiece 115 to operator's mobile device. Alternatively (or additionally), in some embodiments, the Interaction Module 105E may be used to directly or indirectly interact with the End User 125 (e.g., to provide product process information, production status information, and/or information regarding the expected delivery time of the product). In some embodiments, options may be presented to the End User 125 associated with the production process. For example, the Embedded Computing System 105 may determine that it would be cheaper to use electricity during night hours to produce the product; however, this would delay the delivery time by 1-2 more days. In this case, the End User 125 can be presented with the option of delaying the expected delivery time of the product in return for a reduction in the price of the product.

In some embodiments, the Embedded Computing System 105 can store and process information related to multiple workpieces. For example, the Embedded Computing System 105 may be attached and associated with a pallet, bin, or tray that holds multiple workpieces. These workpieces can be split into more than one pallet from one process to the next. Then the information of each workpiece in the first embedded computing system may be passed over to the new embedded computing systems attached to the new pallets accordingly.

Figure 2:
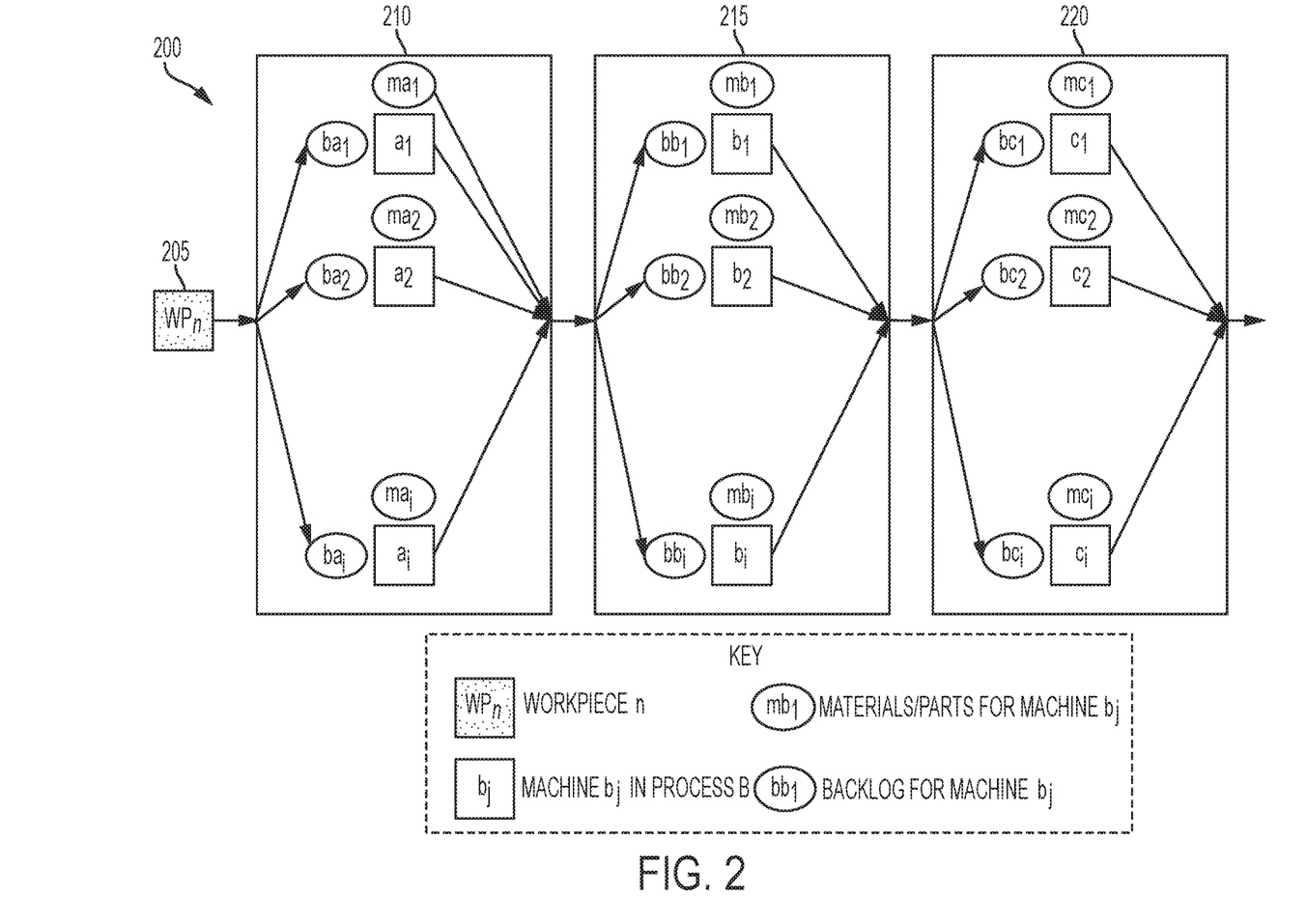
FIG. 2 provides a conceptual view which illustrates how a workpiece moves through three assembling areas in a typical manufacturing plant.

Using the techniques described herein, the intelligence associated with a production or manufacturing process is transferred from machines or a high-level system (e.g., the MES) to the workpiece itself. To illustrate the benefits that an intelligent workpiece would have in a manufacturing environment, FIG. 2 provides a conceptual view 200 of how a Workpiece 205 moves through three Assembling Areas 210, 215, and 220 in a typical manufacturing plant. A typical plant uses information technology, computerized controls, sensors, intelligent motors, production management software and the link to manage each specific stage or operation of a manufacturing process. Conventional manufacturing systems are designed to optimize the overall assembly process employed by the plant rather than the assembly process of a single product. Thus, when there is an incoming Workpiece 205, the automation system decides how to route the workpiece to a machine in Assembling Area 210 based on the buffer status or backlog of each machine $ba_1$, $ba_2 \ldots ba_i$, and available material of each machine $ma_1$, $mat_2 \ldots ma_j$. This approach assumes that all products produced by the process have the same requirements of design, quality, delivery time and cost. Customization of individual products is challenging, if not impossible, with such an approach because the higher-level system would need to track and manage each workpiece individually throughout the assembly process. In turn, this would impose computational requirements on the higher-level system that are not technically feasible. Additionally, the bandwidth of the network supporting the system would need to be robust enough to support the large traffic loads that would be entailed with actively managing and controlling individual workpieces.

Rather than relying on the higher-level system to manage the entire assembly process, the techniques described herein add intelligence to the Workpiece 205 itself, such that it can actively decide how to navigate the manufacturing environment based on its individual product requirements. Thus, returning to FIG. 2, the Workpiece 205 can receive information from the machines in each Assembling Areas 210, 215, and 220 and select a subset of the machines to be used for assembly operators. For example, using information received about machines in Assembling Area 210, the Workpiece 205 may determine that only machine a1 has the materials/parts $ma_1$ to meet the product requirements. Thus, the Workpiece 205 may communicate with an AGV (or other transportation system) to facilitate transportation of the Workpiece 205 to the operating area of machine a1. Alternatively, the Workpiece 205 may determine that the backlog of jobs at machine a1 would cause the Workpiece 205 to miss its delivery deadline and, as result, the Workpiece 205 may select an alternative machine in the Assembling Area 210 with fewer jobs in its backlog. Continuing in this manner, the Workpiece 205 can select a path throughout the Assembling Areas 210, 215, and 220 that is optimized based on the requirements of the product associated with the Workpiece 205.

Figure 3:
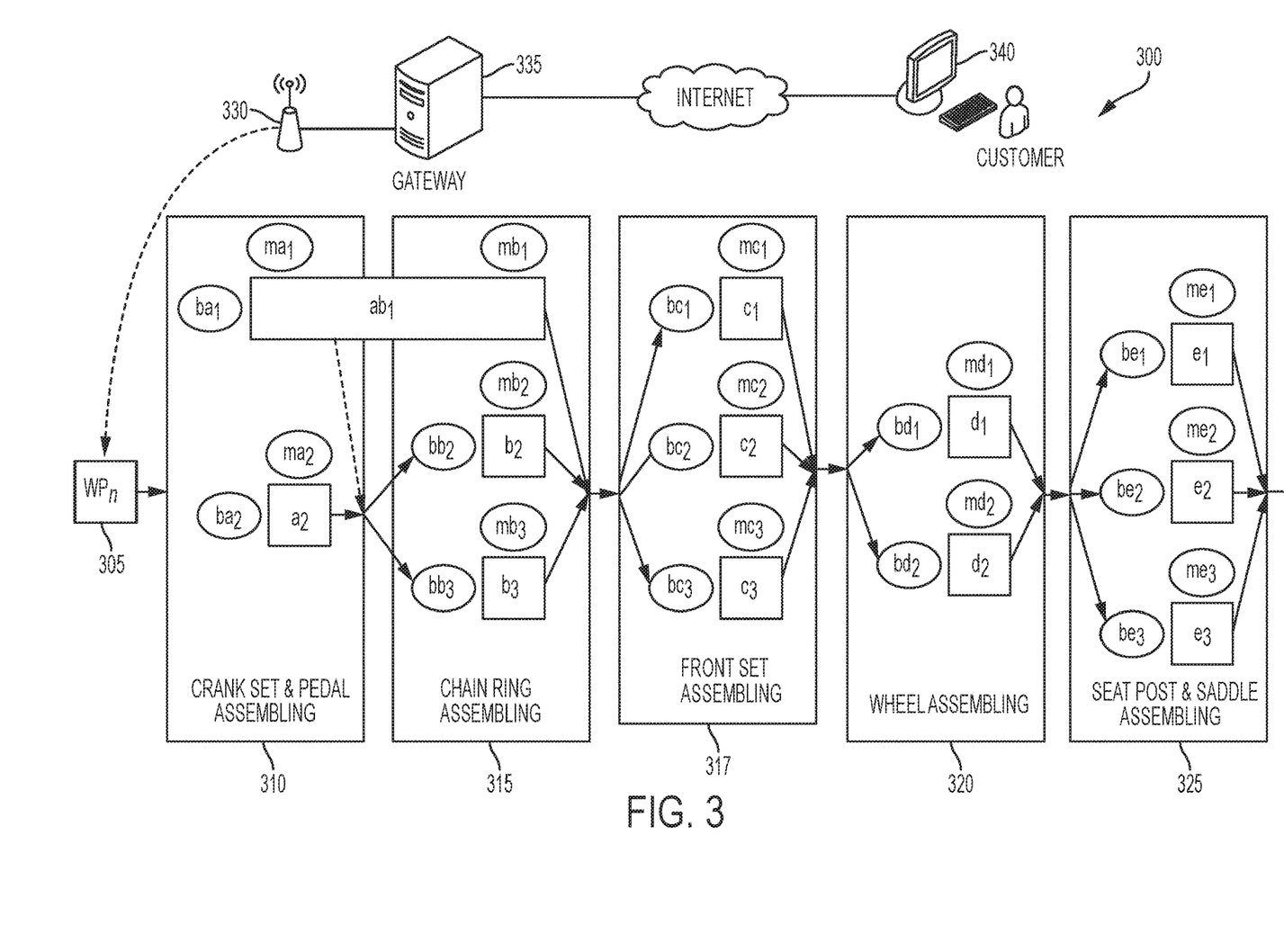
FIG. 3 shows a bicycle assembling line which includes five assembling areas corresponding to steps associated with assembling a bicycle from a bicycle frame.

To illustrate this concept of an intelligent workpiece further, FIG. 3 shows a bicycle assembling line 300 which includes five Assembling Areas 310, 315, 317, 320, and 325 corresponding to steps associated with assembling a bicycle from a bicycle frame, according to some embodiments. Specifically, the five Assembling Areas 310, 315, 317, 320, and 325 correspond to crank set and pedal assembling; chain ring assembling; front set assembling; wheel assembling; and seat post and saddle assembling, respectively. The Workpiece 305 is a bicycle frame which has an embedded computing system (not shown in FIG. 3) attached to the frame itself or its carrier. The embedded computing system is able to exchange data with a Gateway Server 335 on the plant floor via one or more wireless connection points 330, for example, via Wi-Fi. The Gateway Server 335 is also connected to the Internet. Thus, a Customer 340 can communicate directly or indirectly with the Gateway Server 335 to order a bicycle with one or more customized parts (e.g. the size and color of seat post and saddle, and/or the material of the wheels), whereas other parts are just standardized. Following order placement, the Customer 340 is able to exchange data with the Workpiece 305, such as where the Workpiece 305 is within the production process and what is the expected delivery time. The embedded computing system associated with the Workpiece 305 can also exchange data with machines in all assembling areas.

As one step of the whole bicycle assembling procedure, each assembling area comprises two or three machines to perform the same assembling task. Additionally, in the example of FIG. 3, machine $ab_1$ operates in two Assembling Areas 310 and 315, corresponding to crank set & pedal assembling and chain ring assembling, respectively. Machine $ab_1$ is able to perform both assembling tasks and it can release the Workpiece 305 after the process "Crank Set & Pedal Assembling" is finished. Each machine has a buffer in front of it and a material/part pool on the side. The buffer stores backlogged incoming workpiece(s), and the material/part pool stores necessary material and parts.

To monitor and control the assembling process, each of the Assembling Areas 310, 315, 317, 320, and 325 has at least one controller and some assembling areas may have multiple controllers. For example, with reference to FIG. 3, the areas of "front set assembling" and "seat post & saddle assembling" (i.e., Assembling Areas 317 and 325, respectively) may each have a dedicated controller, while in the other three assembling areas (i.e., Assembling Areas 310, 315, and 320), each machine has its own controller. All controllers have a wireless communication interface to exchange data with incoming smart workpieces.

Figure 4:
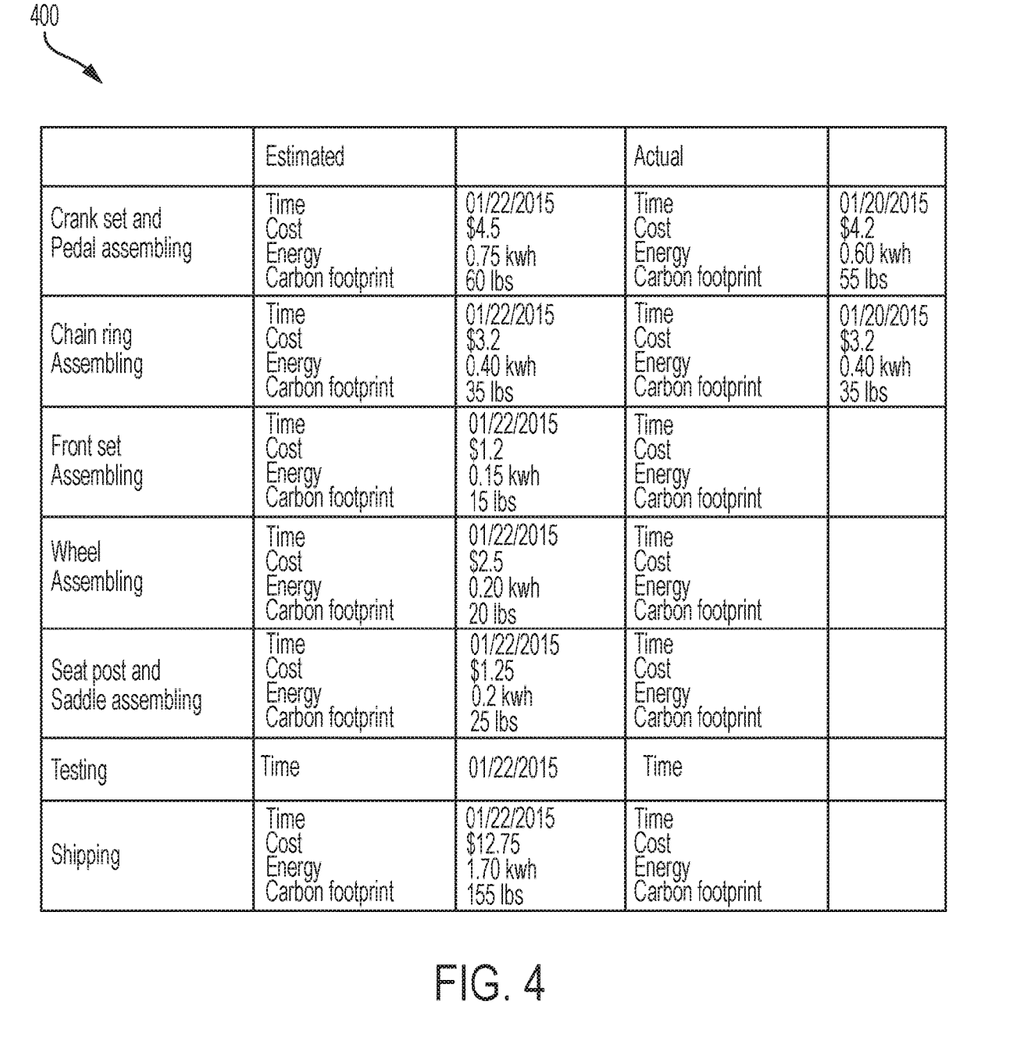
FIG. 4 provides a table showing information that may be collected for the bicycle assembling line shown in FIG. 3, according to some embodiments.

In some embodiments, during each step of the manufacturing process information from the Workpiece 305 may be used to update status information. FIG. 4 provides a table 400 showing information that may be collected for the bicycle assembling line 300 shown in FIG. 3, according to some embodiments. In this example, four pieces of information are collected for each assembling area: time, cost, energy, and carbon footprint. The table 400 shows how this information may appear after manufacturing in the second assembling area (chain ring assembly) has been completed. Note that the table 400 shows both estimate and actual information. Estimate values may be calculated prior to the start of the manufacturing process based on the current state of the system. The table 400 presented in FIG. 4 may be stored on the Workpiece 305 itself and/or on the Gateway Server 335. Additionally, in some embodiments, it may be accessible to the Customer 340. For, example, the table 400 may be delivered via a web page upon request from the Customer 340. Alternatively (or additionally), updates may be pushed to the Customer 340 throughout the manufacturing process, for example, via text message or email.

Figure 5:
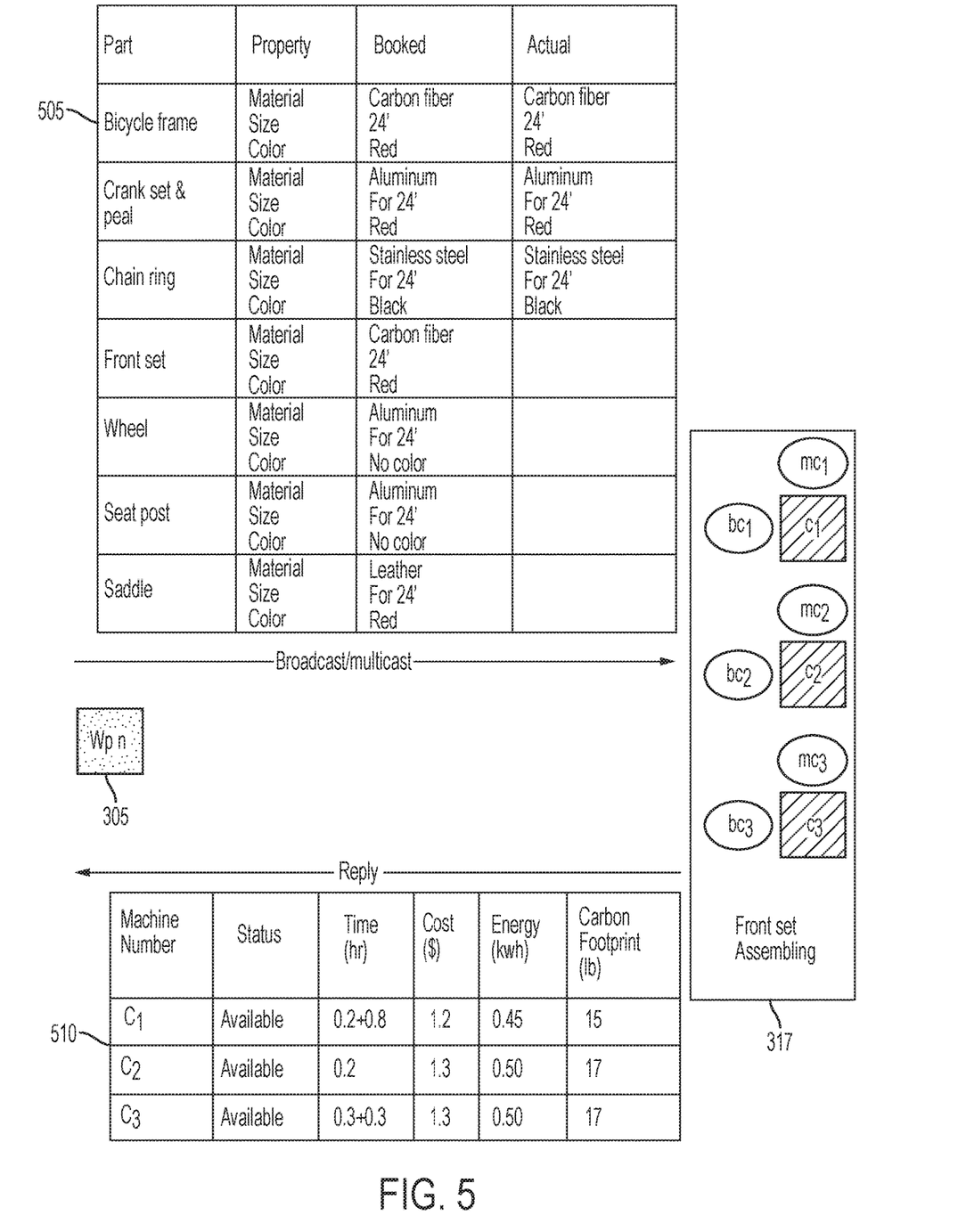
FIG. 5 provides details on the information exchanged by the workpiece and the machines in the bicycle assembling line shown in FIG. 3 at a particular assembling area.

FIG. 5 provides details on the information exchanged by the Workpiece 305 and the machines in the bicycle assembling line 300 shown in FIG. 3 when the Workpiece 305 (i.e., bicycle frame) comes to Assembling Area 317 (i.e., "front set assembling"). Table 505 includes part information that the embedded computing system associated with the workpiece possesses immediately prior to Assembling Area 317. Each row of the table 505 shows a different part that is required for assembly of the final product. The third column shows the parts pre-booked during each staged of the bicycle assembling line 300, in terms of materials, size, and color. Then, the fourth column shows the parts actually used, again in terms of materials, size and color. This fourth column is updated as the workpiece proceeds through the bicycle assembling line 300. Prior to Assembling Area 317, the information presented in the table 505 (or a relevant subset thereof) is transmitted (via broadcast or multicast) to all the machine controllers as a job request. Table 510 lists three replies from three machines to the request broadcasted by the Workpiece 305. In this example, machines $C_1$ and $C_3$ will need more time to finish because they both have backlogs while Machine $C_2$ does not have a backlog so it can start the job immediately.

In addition to the information depicted in FIG. 5, the controllers in the Assembling Area 317 continually transmit (via broadcast or multicast) machine information for the Workpiece 305 to consider. In this way, the Workpiece 305 can make decisions without necessarily broadcasting information on its own. For example, in some embodiments, after receiving broadcasted information from the controllers, the workpiece can communicate directly with a particular controller to submit a job request.

Figure 6:
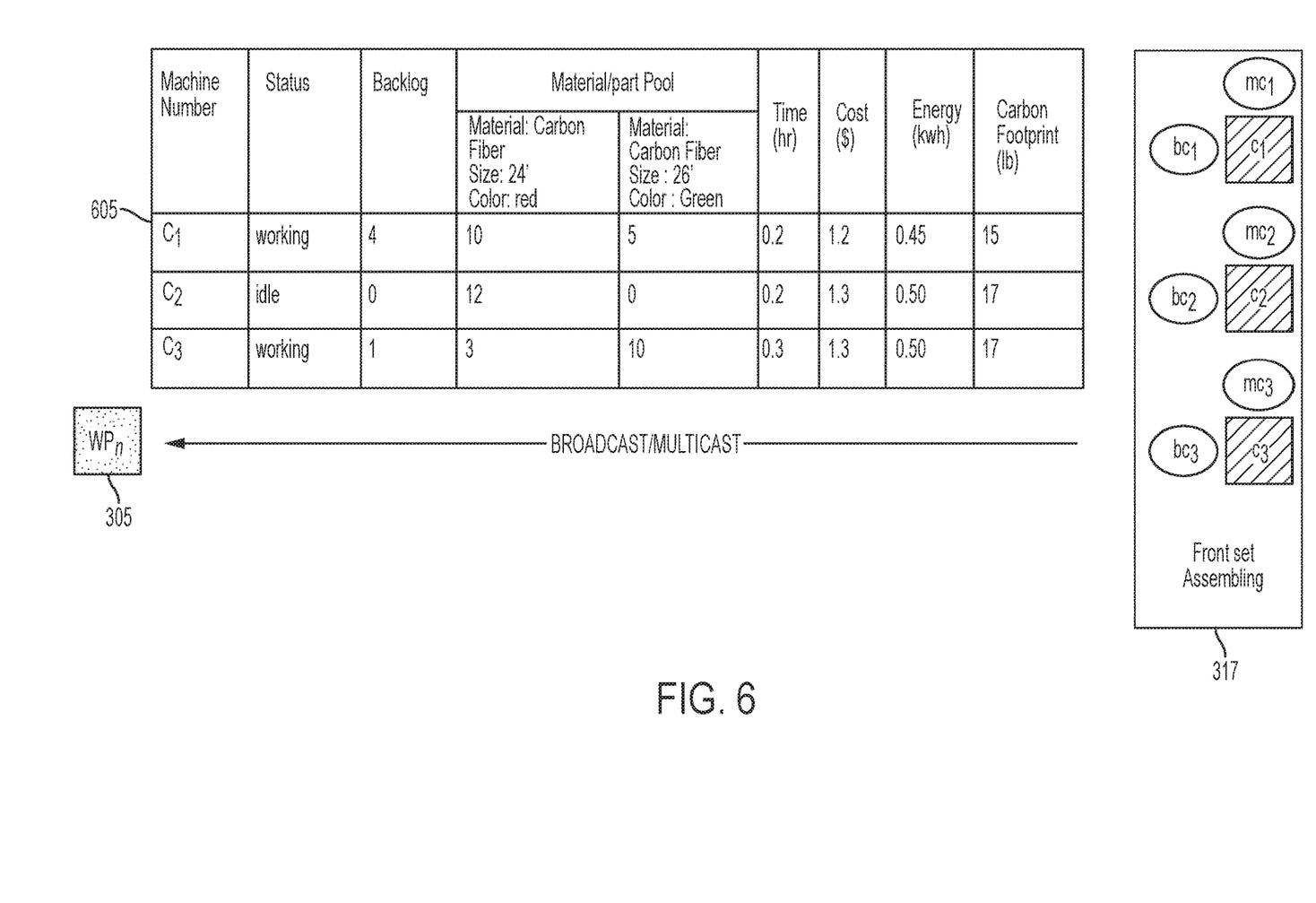
FIG. 6 provides an example of information that may be broadcasted by controllers and collected by the workpiece, according to some embodiments

FIG. 6 provides an example of information that may be broadcasted by controllers and collected by the Workpiece 305, according to some embodiments. Note that, while the information is presented in table 605, information is not necessarily exchanged in tabular form. Also, where multiple controllers are present in a particular assembling area, multiple information messages (e.g., multiple tables) may be received.

In the example of FIG. 6, machines $C_1$ and $C_3$ have indicated that they have a backlog of 4 and 1 workpieces, respectively. The embedded computing system on the Workpiece 305 may then negotiate with the controller of the front set assembling area (i.e., Assembling Area 317), and, based on the customized objectives (e.g., minimum cost or minimum time to finish, or minimum energy consumption and the information of which machine has less backlogged workpiece, cost, time to assemble, availability of booked materials, etc.), find one machine out of $C_1$, $C_2$, and $C_3$, to perform the assembling of front set.

Note that the table 605 shown in FIG. 6 indicates that green colored material is not available in its material/part pool of Machine $C_2$. The Workpiece 305 can resolve this dilemma by notifying the controller of this area to deliver the desired front set to Machine $C_2$. Alternatively, if the waiting time for the desired part is longer than the waiting time for the backlog of the other machines with the right part (e.g., Machine $C_3$), the Workpiece 305 may switch the job to Machine $C_3$. Another alternative would be to notify the end user (e.g., Customer 340) and ask if he/she would like to change to another front set (e.g. red), which is available in $C_2$ material/part pool.

The processors described herein as used by the embedded devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the embedded devices and controllers, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. An intelligent workpiece system comprising:
  a workpiece comprising a portion of a product and having a set of product requirements customized to the product as a combination of design features and desired cost; and
  an embedded computing system attached to the workpiece to provide intelligence at the workpiece for optimization during production of the product from the perspective of the workpiece, the embedded computing system configured to:
    communicate with a plurality of machine controllers in a manufacturing environment to facilitate assembly of the workpiece into the product at a plurality of assembling areas, wherein the manufacturing environment assembles a plurality of products from other workpieces having different customized product requirements;
    transmit the set of product requirements to one or more of the machine controllers which control one or more machines at each respective assembling area of the plurality of assembling areas,
    receive, responsive to the transmitted set of product requirements, machine information from the one or more machine controllers corresponding to machine states and availability of materials or parts in the respective assembling area to meet the set of product requirements, and
    determine a path through the plurality of assembling areas that selects a particular machine of the one or more machines at each respective assembling area of the plurality of assembling areas for performing assembly operations optimized to meet the set of product requirements from the perspective of the workpiece rather than from the perspective of the particular machine, the determined path being based on the received machine information.

2. The intelligent workpiece system of claim 1, wherein the embedded computing system is further configured to communicate with one or more automated guided vehicles to facilitate transportation between the plurality of assembling areas.

3. The intelligent workpiece system of claim 1, wherein the embedded computing system comprises a power supply configured to be recharged at one or more recharging stations within the manufacturing environment.

4. The intelligent workpiece system of claim 1, wherein the embedded computing system is further configured to store records comprising information related to a subset of the machines that performed assembly operations on the workpiece following the assembly process performed at each respective assembling area of the plurality of assembling areas.

5. The intelligent workpiece system of claim 4, wherein the machine information for each respective machine in the subset of the machines comprises an indication of one or more of used materials or parts, energy consumed, or carbon footprint of the respective machine resulting from a respective assembly operation performed on the workpiece.

6. The intelligent workpiece system of claim 5, wherein the machine information for each respective machine in the subset of the machines further comprises one or more of a batch number, a supplier identifier, and an indication of data produced by the respective machine.

7. The intelligent workpiece system of claim 1, wherein the set of product requirements further includes delivery time.

8. The intelligent workpiece system of claim 5, wherein the machine status information includes both estimated values and actual values, wherein the estimated values are calculated prior to start of the assembly operation.

9. A method for manufacturing products using an intelligent workpiece system, each product comprising a workpiece, the method comprising:
  for each product:
    receiving, by an embedded computing system operably coupled to the workpiece, product requirement information from a gateway server, wherein the product requirement information identifies product requirements customized to the product as a combination of design features and desired cost;
    identifying, by the embedded computing system, a plurality of assembling areas for assembling the product using the workpiece, wherein the assembling areas assemble a plurality of products from other workpieces having different customized product requirements;

performing, by the embedded computing system, an optimized assembly process for each of the plurality of assembling areas with optimization of the assembly process from the perspective of the workpiece, the assembly process performed at each respective assembling area of the plurality of assembling areas comprising:

broadcasting or multicasting at least a portion of the product requirement information to one or more machine controllers which control one or more machines in a respective assembling area of the plurality of assembling areas, receiving service availability information corresponding to machine states and availability of materials or parts in the respective assembling area to meet the product requirements, wherein the service availability information is responsive to the product requirement information, determining a path through the plurality of assembling areas that selects a particular machine included in the one or more machines for performing assembly operations optimized to meet the product requirements from the perspective of the workpiece rather than from the perspective of the particular machine, the determined path being based on the received service availability information, communicating with one or more automated guided vehicles to facilitate transportation of the embedded computing system and the workpiece to the particular machine, and providing input information related to the workpiece to the particular machine.

10. The method of claim 9, wherein the product requirement information further includes delivery time.

11. The method of claim 9, further comprising:
following the assembly process performed at each respective assembling area of the plurality of assembling areas, updating an assembly progress record accessible to an end user of the product with information corresponding the assembly process.

12. The method of claim 9, further comprising:
receiving, by the embedded computing system, electricity pricing information, wherein selection of the particular machine included in the one or more machines at each assembling area of the plurality of assembling areas is further based on the electricity pricing information.

13. The method of claim 9, further comprising:
storing, on the embedded computing system, an indication of which machines in each assembling area of the plurality of assembling areas worked on the workpiece.

14. The method of claim 13, further comprising:
determining, by the embedded computing system, an indication of energy consumption resulting from work performed in the assembling area on the workpiece; and storing, on the embedded computing system, the indication of energy consumption resulting from work performed in the assembling area using the workpiece.

15. The method of claim 14, further comprising:
determining, by the embedded computing system, an indication of carbon footprint resulting from work performed in the assembling area; and storing, on the embedded computing system, the indication of carbon footprint resulting from work performed in the assembling area on the workpiece.

16. The method of claim 9, further comprising:
receiving, by the embedded computing system, a request from a requesting device for information related to the workpiece stored on the embedded computing system; and transmitting, by the embedded computing system, an indication of which machines in each assembling area worked on the workpiece to the requesting device in response to the request.

17. The method of claim 9, further comprising:
identifying, by the embedded computing system, an alarm condition related to at least one of the embedded computing system and the workpiece; and transmitting, by the embedded computing system, a message comprising an indication of the alarm condition to an operator device or to a user via the gateway server.

18. The method of claim 17, wherein the alarm condition comprises one or more of a low battery of the embedded computing system, a change in scheduled delivery time, and an upcoming scheduled delivery time.

19. The method of claim 17, wherein the message further comprises information suggesting a modification of the assembly process to address the alarm condition.

* * * * *